(12) United States Patent
Qi

(10) Patent No.: US 12,340,784 B2
(45) Date of Patent: Jun. 24, 2025

(54) AUDIO PROCESSING METHOD, AUDIO PROCESSING APPARATUS AND DEVICE

(71) Applicant: Beijing Zitiao Network Technology Co., Ltd., Beijing (CN)

(72) Inventor: Jianyong Qi, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 112 days.

(21) Appl. No.: 18/464,658

(22) Filed: Sep. 11, 2023

(65) Prior Publication Data
US 2024/0119920 A1   Apr. 11, 2024

(30) Foreign Application Priority Data

Oct. 10, 2022   (CN) .......................... 202211236047.9

(51) Int. Cl.
G10K 11/178   (2006.01)
(52) U.S. Cl.
CPC .. *G10K 11/17815* (2018.01); *G10K 11/17823* (2018.01); *G10K 11/17825* (2018.01); *G10K 11/17883* (2018.01); *G10K 2210/1081* (2013.01); *G10K 2210/30231* (2013.01); *G10K 2210/3026* (2013.01); *G10K 2210/3027* (2013.01); *G10K 2210/3044* (2013.01); *G10K 2210/3055* (2013.01); *G10K 2210/3056* (2013.01)
(58) Field of Classification Search
CPC ....... G10K 11/17815; G10K 11/17819; G10K 11/17823; G10K 11/17825; G10K 11/17881; G10K 11/17883; G10K 11/17885; G10K 2210/1081; G10K 2210/11; G10K 2210/30231; G10K 2210/3056; G10K 2210/3055; G10K 2210/3027; G10K 2210/3026; Y02D 10/00

See application file for complete search history.

(56) References Cited

U.S. PATENT DOCUMENTS 11,631,391 B1 * 4/2023 Tu ..................... G10K 11/17854
381/56
2020/0020315 A1   1/2020 Tachi et al.

FOREIGN PATENT DOCUMENTS

CN   114627847 A   6/2022

* cited by examiner

*Primary Examiner* — Kile O Blair
(74) *Attorney, Agent, or Firm* — Alleman Hall & Tuttle LLP

(57) ABSTRACT

Embodiments of the present disclosure provide an audio processing method, an audio processing apparatus and a device, the method includes: obtaining a first drive electrical signal of an active heat dissipation apparatus; determining a target noise audio signal based on the first driving electrical signal and a first transfer function; determining a denoised audio signal based on the target noise audio signal, where the denoised audio signal is used for denoising a to-be-played audio signal. In this way, a noise signal in the to-be-played audio signal can be offset by the target noise audio signal, resulting in fewer noise signals in the played target audio signal, thereby enhancing an audio playback effect of a virtual reality device.

20 Claims, 8 Drawing Sheets

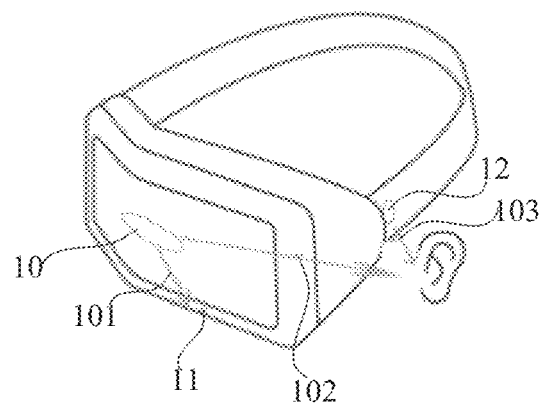

FIG. 1

```
┌─────────────────────────────────────────────────┐
│ Obtaining a first driving electrical signal of  │──S201
│ an active heat dissipation apparatus            │
└─────────────────────────────────────────────────┘
                        │
                        ▼
┌─────────────────────────────────────────────────┐
│ Determining a target noise audio signal based   │──S202
│ on the first driving electrical signal and a    │
│ first transfer function                         │
└─────────────────────────────────────────────────┘
                        │
                        ▼
┌─────────────────────────────────────────────────┐
│ Determining a denoised audio signal based on    │──S203
│ the target noise audio signal                   │
└─────────────────────────────────────────────────┘
```

FIG. 2

AUDIO PROCESSING METHOD, AUDIO PROCESSING APPARATUS AND DEVICE

CROSS-REFERENCE TO RELATED APPLICATIONS

This application claims priority to Chinese Patent Application No. 202211236047.9, filed on Oct. 10, 2022, which is hereby incorporated by reference in its entirety.

TECHNICAL FIELD

Embodiments of the present disclosure relate to the field of electronic technology and, in particular, to an audio processing method, an audio processing apparatus, and a device.

BACKGROUND

With continuous development of virtual reality technologies, an application range of virtual reality devices in people's lives is becoming increasingly widespread. The current virtual reality devices have a high demand for display and computing functions, resulting in a heavy load on processors of the virtual reality devices. In order to enhance a heat dissipation function of the processors, active heat dissipation apparatuses are usually installed inside the virtual reality devices to cool the processors.

In actual usages, when the active heat dissipation apparatus is turned on, noise will be generated, and the above noise is easily mixed with a to-be-played audio of the virtual reality device, thereby reducing an audio playback effect of the virtual reality device.

SUMMARY

Embodiments of the present disclosure provide an audio processing method, an audio processing apparatus and a device, which solves a problem of a poor audio playback effect of a virtual reality device.

In a first aspect, an embodiment of the present disclosure provide an audio processing method, applied to a virtual reality device, where the virtual reality device includes an active heat dissipation apparatus, and the method includes:
  obtaining a first driving electrical signal of the active heat dissipation apparatus;
  determining a target noise audio signal based on the first driving electrical signal and a first transfer function;
  determining a denoised audio signal based on the target noise audio signal, where the denoised audio signal is used for denoising a to-be-played audio signal.

In a second aspect, an embodiment of the present disclosure provide an audio processing apparatus, applied to a virtual reality device, where the virtual reality device includes an active heat dissipation apparatus, and the audio processing apparatus includes:
  a first acquiring module, configured to obtain a first driving electrical signal of the active heat dissipation apparatus;
  a first determining module, configured to determine a target noise audio signal based on the first driving electrical signal and a first transfer function;
  a second determining module, configured to determine a denoised audio signal based on the target noise audio signal, where the denoised audio signal is used for denoising a to-be-played audio signal.

In a third aspect, an embodiment of the present disclosure provide a virtual reality device, including an active heat dissipation apparatus and the audio processing apparatus according to the second aspect mentioned above.

In a fourth aspect, an embodiment of the present disclosure provide an electronic device, including: a processor and a memory;
  the memory stores computer execution instructions;
  the processor executes the computer execution instructions stored in the memory, to enable the processor to execute the audio processing method according to the first aspect and various possibilities of the first aspect.

In a fifth aspect, an embodiment of the present disclosure provide a computer readable storage medium, where the computer readable storage medium stores computer execution instructions, when a processor executes the computer execution instructions, the audio processing method according to the first aspect and various possibilities of the first aspect is implemented.

In a sixth aspect, an embodiment of the present disclosure provide a computer program product, including a computer program, where the computer program implements the audio processing method according to the first aspect and various possible designs of the first aspect when executed by a processor.

The embodiments of the present disclosure provide an audio processing method, an audio processing apparatus, and a device, where the method can determine a target noise audio signal by means of a first driving electrical signal and a first transfer function, thereby reducing interference of other noise signals in an environment where a virtual reality device is located, and improving accuracy of determination results of the target noise audio signal. Moreover, through determining a denoised audio signal used for a denoising processing of the to-be-played audio signal based on the target noise audio signal, it can offset the noise signal in the to-be-played audio signal by means of the target noise audio signal, thereby reducing an impact of noises of an active heat dissipation apparatus on a to-be-played audio of the virtual reality device, and enhancing an audio playback effect of the virtual reality device.

BRIEF DESCRIPTION OF DRAWINGS

In order to provide a clearer explanation of embodiments of the present disclosure or technical solutions in the prior art, a brief introduction will be given to accompanying drawings required in a description of the embodiments or prior art. It is evident that the accompanying drawings in the following description are some embodiments of the present disclosure. For those of ordinary skill in the art, other accompanying drawings can be obtained based on these accompanying drawings without any creative effort.

FIG. 1 is a schematic structural diagram of a virtual reality device provided by an embodiment of the present disclosure.

FIG. 2 is a first flowchart of an audio processing method provided by an embodiment of the present disclosure.

DESCRIPTION OF EMBODIMENTS

Figure 3A:
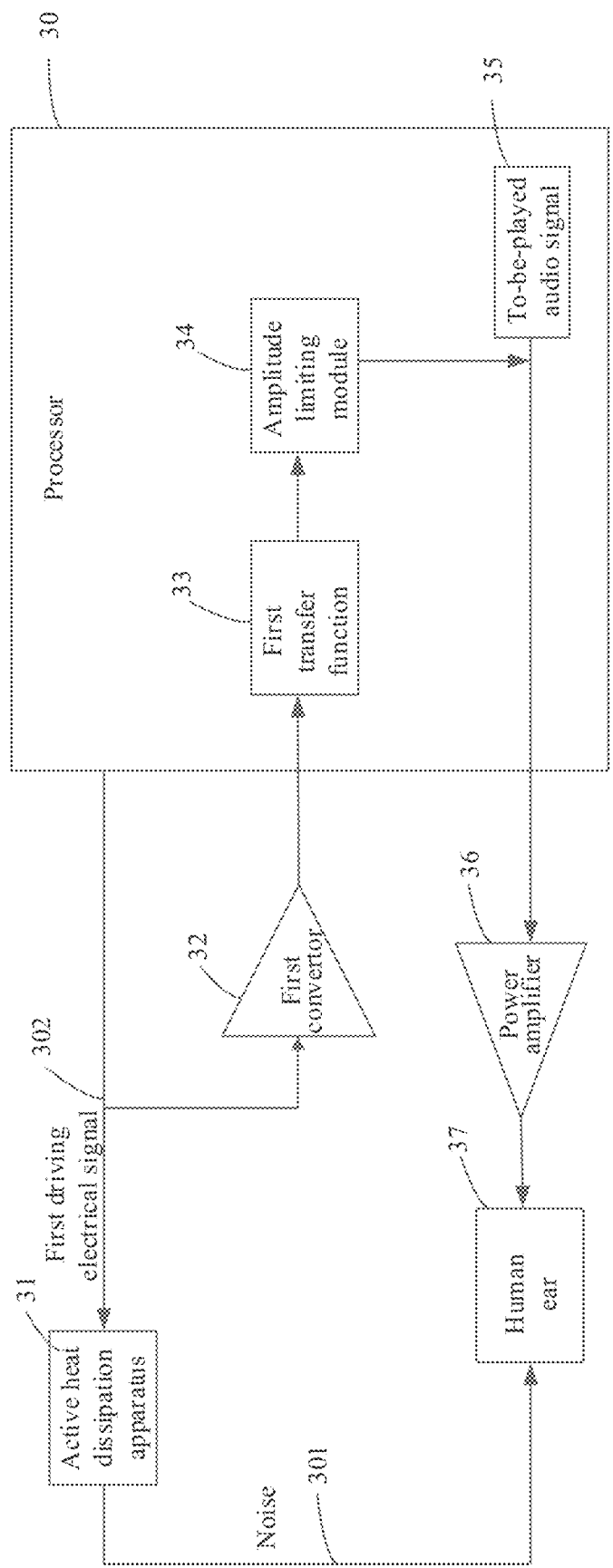
FIG. 3A is a first application scenario sample diagram of a virtual reality device provided by an embodiment of the present disclosure.

In order to make purposes, technical solutions and advantages of embodiments of the present disclosure clearer, the following will provide a clear and complete description of the technical solution in the embodiment of the present disclosure in conjunction with the accompanying drawings of the embodiments of the present disclosure. Obviously, the described embodiments are a part of the embodiments of the present disclosure, but not all of them. Based on the embodiments of the present disclosure, all other embodiments obtained by those of ordinary skill in the art without creative effort would fall within a protection scope of the present disclosure.

For ease of understanding, concepts involved in the embodiments of the present disclosure will be explained below.

Virtual reality device: a device that applies a virtual reality (VR) technology, so that the virtual reality devices can also be referred to as VR devices. And the VR devices can be used in scenarios such as dynamic environment constructing, real-time three-dimensional image constructing, and stereoscopic displaying.

Transfer function: a processor of the virtual reality device can process an input signal by means of the transfer function, so as to obtain an output signal corresponding to the above input signal. However, a processing of the input signal performed by the processor by means of the transfer function is not specifically defined. For example, the processor can backward process the input signal by means of the transfer function to obtain the output signal with an opposite phase to the input signal.

When the virtual reality device is in an operation state, due to a huge amount of computation required by the processor and a large display size of a display screen of the virtual reality device, it is necessary to enhance the heat dissipation function of the above processor. An active heat dissipation apparatus are usually installed inside the virtual reality device to cool down the processor. However, when the active heat dissipation apparatus is in an operation state (i.e., when the active heat dissipation apparatus is turned on), it will generate noise (for example, when the active heat dissipation apparatus is a fan, the noise can be sound generated by rotation of fan blades), and the above noise is easily mixed with to-be-played audio of the virtual reality device, which easily causes the noise mixed in audio played by the virtual reality device, thereby reducing an audio playback effect of the virtual reality device.

For example, as shown in FIG. 1, a virtual reality device is equipped with an exhausting hole 10 of an active heat dissipation apparatus, a sound receiving hole 11 of a sound acquiring apparatus and a sound outputting hole 12 of a sound playback apparatus. When the sound playback apparatus plays audio, the audio will be sequentially transmitted to ears of a user through the sound outputting hole 12 of the sound playback apparatus and a propagation path 103. At the same time, the noise generated when the active heat dissipation apparatus is in operation is sequentially transmitted to the ear of the user through the exhausting hole 10 of the active heat dissipation apparatus and a propagation path 102, which means that the above two types of audio will be mixed together, resulting in poor audio playback effect of the virtual reality device. Even though the noise generated when the active heat dissipation apparatus is in operation can be sequentially transmitted to the sound acquiring apparatus through a propagation path 101 and the sound receiving hole 11 of sound acquiring apparatus, adopting the above method can easily lead to the noise in an environment where the virtual reality device is located and the noise generated by a speech of the user being collected by the sound acquiring apparatus, which would lead to low accuracy of the sound acquiring apparatus for collection results of the noise generated when the active heat dissipation apparatus is in operation. At the same time, the accuracy of final played audio obtained by processing the to-be-played audio based on the collected noise will also be lower, thereby reducing the audio playback effect of the virtual reality device.

In order to solve above technical problems, embodiments of the present disclosure provide an audio processing method and an audio processing apparatus, which can determine a target noise audio signal by means of a first driving electrical signal and a first transfer function inside a virtual reality device, so that the determined target noise audio signal will not be interfered by other noise signals (i.e., other noise) in an external environment, that is, it can reduce interference of other noise signals in the environment where the virtual reality device is located, and improve accuracy of determination results of the target noise audio signal. At the same time, a target audio signal is determined based on a to-be-played audio signal and the target noise audio signal, where the target noise audio signal can be a reverse signal of the noise signal in the to-be-played audio signal, that is, the noise signal in the to-be-played audio signal can be offset by the target noise audio signal, thereby enhancing an audio playback effect of the virtual reality device.

The following will explain application scenarios of the embodiment of the present disclosure.

The embodiments of the present disclosure can be used on the virtual reality device, for example, when the virtual reality device is playing a certain audio, since the active heat dissipation apparatus of the virtual reality device may generate noise when it is in operation, which could result in an audio signal ultimately transmitted to ears of a user including the above noise. Therefore, the target noise audio signal can be determined based on the first driving electrical signal of the active heat dissipation apparatus, and the noise signal (i.e., the above noise) included in the to-be-played audio signal can be offset by the target noise audio signal, thereby enhancing the audio playback effect of the virtual reality device.

A difference between another application scenario provided by the embodiment of the present disclosure and the above application scenario is that the virtual reality device of the embodiment of the present disclosure can play videos, and the audio corresponding to the played videos will also be mixed with the noise generated when the active heat dissipation apparatus of the virtual reality device is in operation.

The followings are detailed explanation about technical solutions of the present disclosure and how the technical solutions of the present disclosure will solve the above technical problems based on specific embodiments. And the following specific embodiments can be combined with each other, and same or similar concepts or processes may not be repeated in some embodiments. The following will describe the embodiments of the present disclosure in conjunction with the accompanying drawings.

Referring to FIG. 2, FIG. 2 is a first flowchart of an audio processing method provided by an embodiment of the present disclosure. The method of this embodiment can be applied to a virtual reality device, and the virtual reality device includes an active heat dissipation apparatus, and the audio processing method includes the following.

S201: obtaining a first driving electrical signal of the active heat dissipation apparatus.

Where, specific types of the active heat dissipation apparatus are not limited here. For example, the active heat dissipation apparatus can be a fan, and rotations of fan blades (i.e., the fan is in operation) will generate noise; alternatively, the active heat dissipation apparatus can also be a compressor, and the noise can also be generated when the compressor is in operation.

Where, the first driving electrical signal can also be referred to as a circuit signal of the active heat dissipation apparatus. When the active heat dissipation apparatus is the fan, the first driving electrical signal can be referred to as a fan circuit signal.

S202: determining a target noise audio signal based on the first driving electrical signal and a first transfer function.

It should be noted that, a specific method for determining the target noise audio signal based on the first driving electrical signal and the first transfer function is not limited here.

The target noise audio signal can be determined by the following method: directly determining the target noise audio signal based on the first driving electrical signal and the first transfer function. This can reduce computational steps, improve a computational efficiency and save computational resources.

The target noise audio signal can also be determined by the following method: determining a first audio signal corresponding to the first driving electrical signal; and determining the target noise audio signal based on the first transfer function and the first audio signal.

Where, the first driving electrical signal may has a one-to-one correspondence with the first audio signal. For example, the higher a value of the first driving electrical signal, the louder a loudness of the first audio signal; and the smaller the value of the first driving electrical signal, the lower the loudness of the first audio signal.

The first audio signal can be obtained by converting the first driver electrical signal, or the first audio signal can be pre-stored on the virtual reality device or a server, and a processor of the virtual reality device can obtain the above first audio signal from the virtual reality device or the server based on the first driver electrical signal.

In the embodiment of the present disclosure, the first audio signal corresponding to the first driving electrical signal can be determined first, and the target noise audio signal can be determined based on the first transfer function and the first audio signal. Therefore, since the first audio signal is an audio signal, accuracy about recognition results of the audio signal by the first transfer function is higher than that of other signals, compared with the method of directly determining the target noise audio signal by means of the first driving electrical signal and the first transfer function, the accuracy of the target noise audio signal determined by the embodiment of the present disclosure is higher.

S203: determining a denoised audio signal based on the target noise audio signal.

Where, the target noise audio signal can be referred to as a reverse noise signal of a noise signal included in a to-be-played audio signal. By overlaying the target noise audio signal and the to-be-played audio signal, the noise signal (also known as noise) in the to-be-played audio signal can be offset, so as to enhance an audio playback effect of the virtual reality device.

Where, the denoised audio signal is used for denoising the to-be-played audio signal. Where, the to-be-played audio signal can include the noise generated when the active heat dissipation apparatus is in operation, and a specific acquiring method of the noise generated when the active heat dissipation apparatus is in operation is not limited here. For example, the noise generated when the active heat dissipation apparatus is in operation can be a pre-collected signal and stored in the virtual reality device; alternatively, stored in a server, and the virtual reality device can download the above noise obtained from the server.

Where, the specific method for determining the denoised audio signal based on the target noise audio signal is not limited here.

Reducing the loudness of the target noise audio signal to a preset value to obtain the denoised audio signal;

where, the reducing the loudness of the above target noise audio signal can also be referred to as an amplitude limitation of the target noise audio signal.

In the embodiment of the present disclosure, the loudness of the target noise audio signal is lowered to the preset value to obtain the denoised audio signal, ensuring that the loudness of the denoised audio signal is low, which could reduces an occurrence of a whistling phenomenon caused by the excessive loudness of the denoised audio signal, and further improve the audio playback effect of the virtual reality device. In an implementation, the virtual reality device can also determine the target noise audio signal as the denoised audio signal, which is not limited by the embodiment of the present disclosures.

In an implementation, after determining the denoised audio signal by the virtual reality device, the virtual reality device can also play the target audio signal after denoising the to-be-played audio signal. A specific way for playing the target audio signal by the virtual reality device is: obtaining the to-be-played audio signal of the virtual reality device, overlapping the to-be-played audio signal with the denoised audio signal to obtain the target audio signal, and playing the target audio signal. In this way, the noise in the to-be-played audio signal can be reduced by means of the denoised audio signal, and the denoised audio signal is a loudness-corrected audio signal, which can avoid the whistling phenomenon during an audio playback and improve the audio playback effect of the virtual reality device.

In the embodiment of the present disclosure, by means of steps S201 to S203, the target noise audio signal can be determined by means of the first driving electrical signal and the first transfer function, thereby reducing interference of other noise in an environment where the virtual reality device is located, improving the accuracy of the determination results of the target noise audio signal. And through determining the denoised audio signal based on the target noise audio signal, that is, the noise signal in the to-be-played audio signal is offset by the target noise audio signal, an impact of the noise of the active heat dissipation apparatus on the to-be-played audio of the virtual reality device is reduced, and the audio playback effect of the virtual reality device is enhanced.

In the following, combined with FIGS. 3A to 3D, the audio processing method of the above virtual reality device will be explained through specific examples.

FIG. 3A is a first application scenario sample diagram of a virtual reality device provided by an embodiment of the present disclosure. Referring to FIG. 3A, the virtual reality device includes a processor 30, an active heat dissipation apparatus 31, a first converter 32 and a power amplifier 36, and a human ear 37 of a user is also included in FIG. 3A. A first driving electrical signal 302 of the active heat dissipation apparatus 31 can be converted to a first audio signal through the first converter 32, and a target noise audio signal can be determined based on the first audio signal and a first transfer function 33, a target audio signal can be determined based on a to-be-played audio signal 35 and the target noise audio signal. The target audio signal is processed by the power amplifier 36 and can be transmitted to the human ear 37. 301 in FIG. 3A represents a propagation path that noise generated when the active heat dissipation apparatus 31 is in operation being transmitted to the human ear 37.

The target noise audio signal can be determined based on the following methods:

processing the first audio signal by means of the first transfer function to obtain a to-be-verified audio signal; obtaining a second audio signal at an earpiece of the virtual reality device; when the to-be-verified audio signal and the second audio signal meet a first matching condition, determining the to-be-verified audio signal as the target noise audio signal.

Where, the second audio signal can include noise generated when the active heat dissipation apparatus is in operation (usually considered to be in low noise scenarios such as laboratories), and this noise can be propagated to the earpiece of the virtual reality device in an external environment. At this point, if a matching degree between the to-be-verified audio signal and the second audio signal can be greater than a first value, it is considered that the to-be-verified audio signal and the second audio signal meet the first matching condition.

It should be noted that, a sound playback apparatus can be set on the virtual reality device, and the type of the sound playback apparatus is not limited here. For example, the sound playback apparatus can include at least one of an earphones and a speaker.

The second audio signal can not only include the noise generated when the active heat dissipation apparatus is in operation, but also other noises, such as a speaking sound of the user, environmental noise and the like. At this time, if the matching degree between the to-be-verified audio signal and the second audio signal can be greater than a second value and less than the first value, it is considered that the to-be-verified audio signal and the second audio signal meet the first matching condition.

It should be noted that, the above second value and first value can be considered as empirical thresholds, i.e., can be values obtained by a pre-detection.

In the implementation of the present disclosure, the to-be-verified audio signal can be verified by means of the second audio signal. Only when the to-be-verified audio signal and the second audio signal meet the first matching condition, the to-be-verified audio signal can be determined as the target noise audio signal. This improves accuracy of the determination result of the target noise audio signal and reduces errors of the determination result of the target noise audio signal.

Figure 3B:
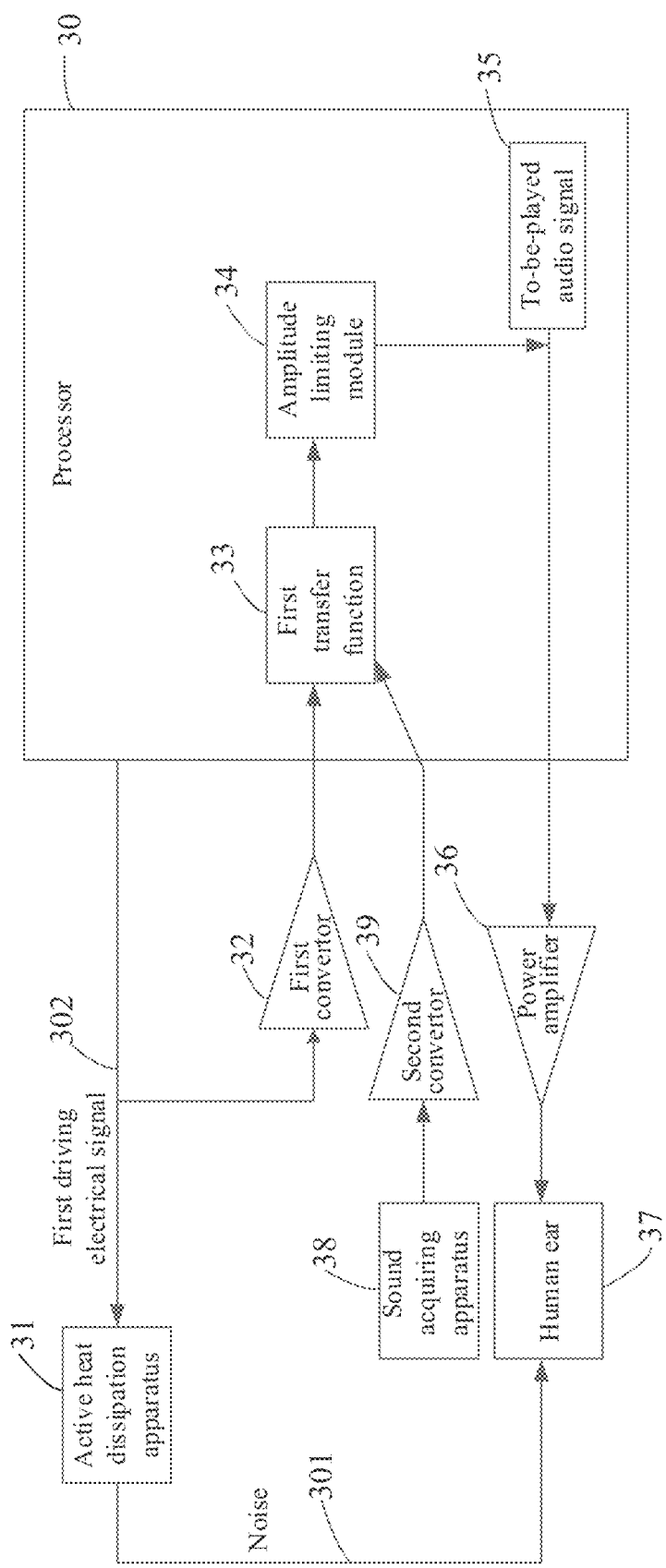
FIG. 3B is a second application scenario sample diagram of a virtual reality device provided by an embodiment of the present disclosure.

FIG. 3B is a second application scenario sample diagram of a virtual reality device provided by an embodiment of the present disclosure. Referring to FIG. 3B, the virtual reality device can also include a sound acquiring apparatus 38 and a second converter 39. The sound acquiring apparatus 38 can be located at a human ear 37, and the above sound acquiring apparatus 38 can use a second audio signal (specifically, it can be performing a format conversion on the second audio signal, such as converting an analog signal into a digital signal), and convert the second audio signal by means of the second converter 39, and verify a to-be-verified audio signal based on the converted second audio signal. Only when the to-be-verified audio signal and the second audio signal meet first matching condition, the to-be-verified audio signal is determined as a target noise audio signal. It can also be considered as verifying a first transfer function 33, accuracy of the processing results of the first audio signal by the first transfer function 33 is verified. When the first matching condition is met, it can be considered that the accuracy of the processing result of the first audio signal by the first transfer function 33 meets requirements, otherwise the requirement is not met.

The first transfer function can be determined as follows: the virtual reality device also includes a sound acquiring apparatus and a sound playback apparatus, where the first transfer function is a product of a second transfer function and a third transfer function; the second transfer function is a transfer function corresponding to a sound propagation path between the active heat dissipation apparatus and the sound acquiring apparatus; and the third transfer function is the transfer function corresponding to the sound propagation path between the sound acquiring apparatus and the sound playback apparatus.

In the embodiment of the present disclosure, since first noise exists in the sound propagation path between the active heat dissipation apparatus and the sound acquiring apparatus, second noise exists in the sound propagation path between the sound acquiring apparatus and the sound playback apparatus, and the first transfer function is the product of the second transfer function and the third transfer function. In this way, when determining the target noise audio signal by means of the first transfer function and the first audio signal, the determined target noise audio signal is enabled to reflect the above first noise and second noise, further improving the accuracy of determination results of the target noise audio signal, and further improving an audio playback effect of the virtual reality device.

Figure 3C:
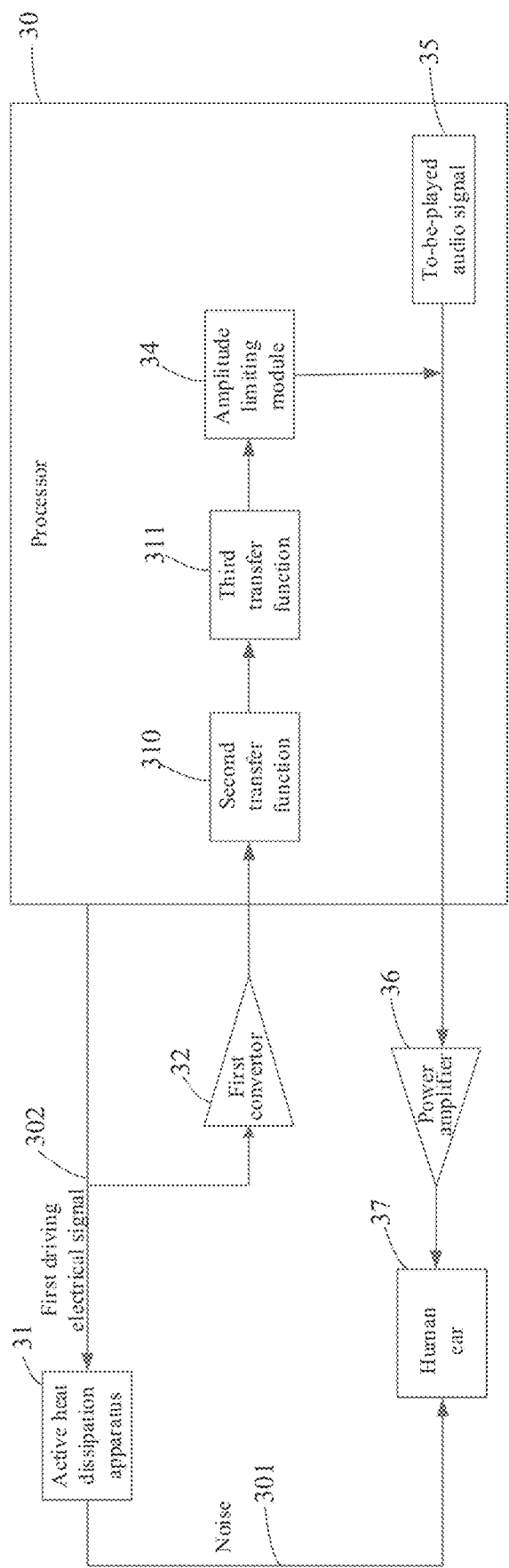
FIG. 3C is a third application scenario sample diagram of a virtual reality device provided by an embodiment of the present disclosure.

FIG. 3C is a third application scenario sample diagram of a virtual reality device provided by an embodiment of the present disclosure. Referring to FIG. 3C, which includes a second transfer function 310 and a third transfer function 311, while the first transfer function 33 in FIGS. 3A and 3B can be considered as a product of the second transfer function 310 and the third transfer function 311 in FIG. 3C.

The first transfer function can also be determined by the following methods: the minimum mean square error method and the transverse adaptive filtering algorithm can be used to calculate to obtain the first transfer function through multiple iterations. In this way, accuracy of the first transfer function can be higher.

Where, the second transfer function can be tested in a laboratory environment (which can be understood as there is only noise generated when an active heat dissipation apparatus is in operation at an earpiece of the virtual reality device). And the third transfer function can be obtained through multiple tests and calculations.

The second transfer function can be determined by the following method:
obtaining a second driving electrical signal of the active heat dissipation apparatus;
determining a second audio signal corresponding to the second driving electrical signal; and
determining the second transfer function based on the second audio signal.

Where, the second driving electrical signal can be referred to relevant expressions of the above first driving electrical signal, details of which will not be elaborated here.

Where, a determining method of the second audio signal can also be referred to the determining method of the above first audio signal, details of which will not be elaborate here.

Where, the determining the second transfer function based on the second audio signal can be understood as: determining the second audio signal as the transfer function corresponding to a reverse signal.

In the embodiment of the present disclosure, the determining the second transfer function based on the second audio signal can ultimately improve the accuracy of determination results of the second transfer function.

Referring to FIGS. 3A to 3C, the virtual reality device can include an amplitude limiting module 34, which can be used to reduce a loudness of the target noise audio signal to a preset value, to obtain a corrected audio signal. The corrected audio signal and the to-be-played audio signal are be overlapped to obtain the target audio signal.

Figure 3D:
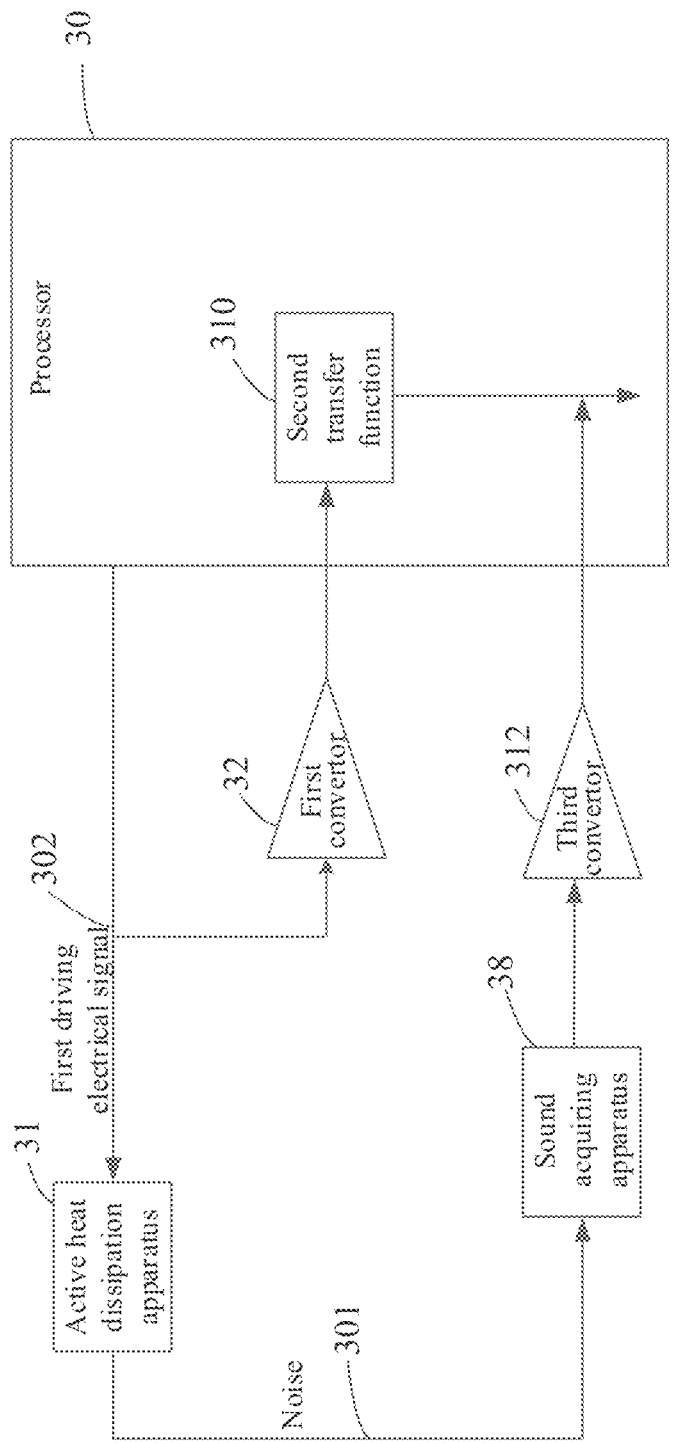
FIG. 3D is a fourth application scenario sample diagram of a virtual reality device provided by an embodiment of the present disclosure.

FIG. 3D is a third application scenario sample diagram of a virtual reality device provided by an embodiment of the present disclosure. Referring to FIG. 3D, a second driving electrical signal can be converted through a first converter 32 to obtain a second audio signal, and a second transfer function 310 can be determined based on the second audio signal. After obtaining the second transfer function 310, a noise signal collected by a sound acquiring apparatus 38 can also be converted through a third converter 312 (specifically, it could be a format conversion, such as converting the noise signal from an analog format to a digital format), and the second transfer function 310 is verified through the converted signal.

The second transfer function can also be determined by:
determining a to-be-verified transfer function based on the second audio signal;
verifying a third audio signal of an environment where the virtual reality device is located;
when a signal obtained through processing the third audio signal by the to-be-verified transfer function meets a second matching condition, determining the to-be-verified transfer function as the second transfer function.

Where, since the third audio signal may include at least one of environmental noise and user speaking noise, when a matching degree between the signal obtained through processing the third audio signal by the to-be-verified transfer function and a preset signal is greater than a preset value, it can be considered that the second matching condition is met. The above preset signal can be noise generated when the active heat dissipation apparatus is in operation, or, the above preset signal can be understood as the above second audio signal.

In the embodiment of the present disclosure, when the signal obtained through processing the third audio signal by the to-be-verified transfer function meets the second matching condition, the to-be-verified transfer function is determined as the second transfer function, which can further improve accuracy of determination results of the second transfer function.

The following is a specific embodiment to illustrate the above embodiments. An active heat dissipation apparatus in the embodiment of the present disclosure can be a fan, a sound acquiring apparatus can be a microphone, and a sound playback apparatus can be a speaker.

Figure 4:
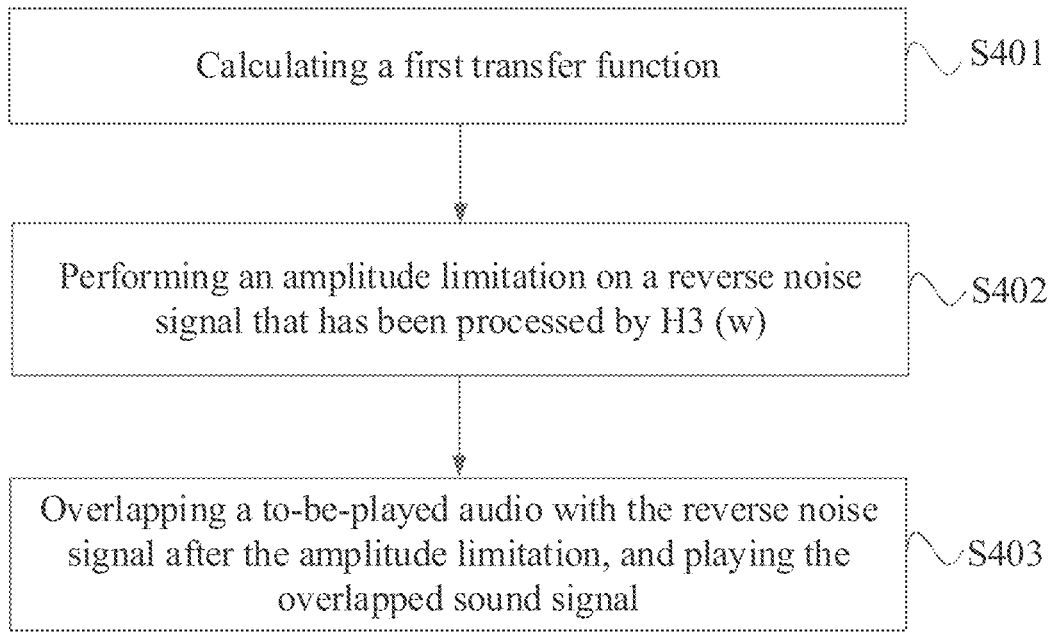
FIG. 4 is a second flowchart of an audio processing method provided by an embodiment of the present disclosure.

FIG. 4 is a second flowchart of an audio processing method provided by an embodiment of the present disclosure. Please refer to FIG. 4, which includes the following.

S401: calculating a first transfer function;
where, the first transfer function can be a transfer function corresponding to a sound propagation path from the fan to the speaker. An optional calculation method for the first transfer function is: it can be obtained by calculating with an adaptive algorithm, such as the minimum mean square error method and the transverse adaptive filtering algorithm. The above first transfer function can be calculated by relying on a noise reference source (such as noise generated when the fan is in operation) and an error signal (such as a difference between the noise generated when the fan is in operation and the noise collected by the microphone).

Another optional calculation method for the first transfer function is: calculating a second transfer function and a third transfer functions first, and obtaining the first transfer function based on a product of the second transfer function and the third transfer functions;
where, the first transfer function can be referred to as H3 (w), the second transfer function can be referred to as H1 (w), and the third transfer function can be referred to as H2 (w). H1 (w) serves as the transfer function of a path that the fan (i.e., the active heat dissipation apparatus) transmits to the microphone (i.e., the sound acquiring apparatus), which needs to be obtained thorough being tested in a laboratory environment (without noise interference from external environmental).

H2 (w) can also be calculated, where H2 (w) can be obtained by calculating based on a signal obtained through processing fan noise by H1 (w), and the fan noise can be the noise received by the microphone.

It should be noted that, the above two calculation methods can also be combined to use, that is, after obtaining the first transfer function and the second transfer functions, the first and second transfer functions can also be iteratively calculated multiple times, then the third transfer function is ultimately obtained, which could improve accuracy of results of the third transfer function.

S402: performing an amplitude limitation on a reverse noise signal that has been processed by H3 (w).

Where, an amplitude limiting module can be set up in the virtual reality device, so as to perform the amplitude limitation on the reverse noise signal after processing by H3 (w), thereby avoiding an occurrence of a whistling phenomenon.

S403: overlapping a to-be-played audio with the reverse noise signal after the amplitude limitation, and playing the overlapped sound signal.

In the embodiment of the present disclosure, by means of the above steps S401 to S403, an audio playback effect of the virtual reality device can also be enhanced.

Figure 5:
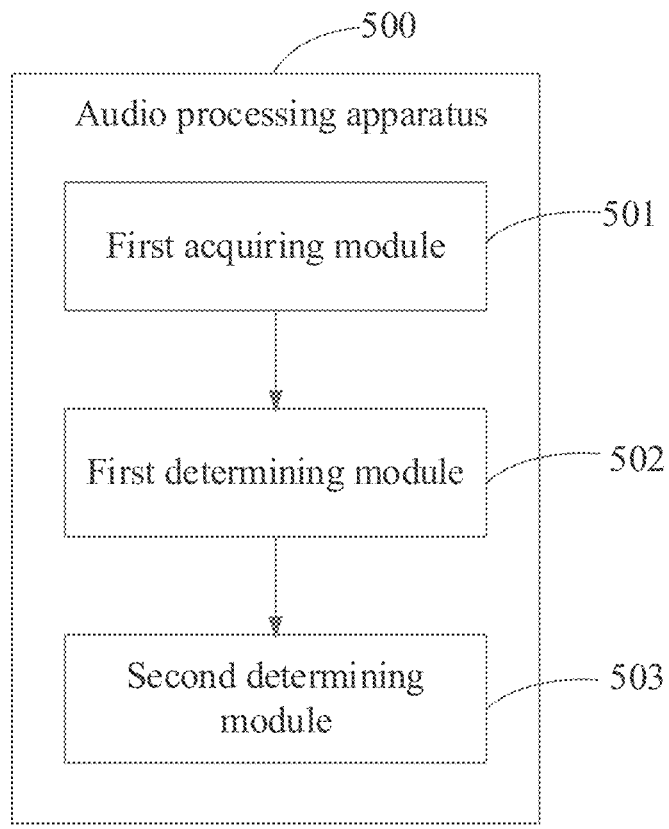
FIG. 5 is a first schematic structural diagram of an audio processing apparatus provided by an embodiment of the present disclosure.

Corresponding to the audio processing method in the previous embodiment, FIG. 5 is a schematic structural diagram of an audio processing apparatus provided by an embodiment of the present disclosure. For ease of explanation, only parts related to the embodiment of the present disclosures are shown. The audio processing apparatus is applied to a virtual reality device, and the virtual reality device includes an active heat dissipation apparatus. Referring to FIG. 5, the audio processing apparatus 500 includes a first acquiring module 501, a first determining module 502 and a second determining module 503.

Where, the first acquiring module 501 is configured to obtain a first driving electrical signal of the active heat dissipation apparatus;

the first determining module 502 is configured to determine a target noise audio signal based on the first driving electrical signal and a first transfer function;

the second determining module 503 is configured to determine a denoised audio signal based on the target noise audio signal, where the denoised audio signal is used for denoising a to-be-played audio signal.

In one embodiment of the present disclosure, the first determining module 502 is specifically configured to determine a first audio signal corresponding to the first driving electrical signal; and determine the target noise audio signal based on the first transfer function and the first audio signal.

In one embodiment of the present disclosure, the first determining module 502 is specifically configured to process the first audio signal by means of the first transfer function to obtain a to-be-verified audio signal; obtain a second audio signal at an earpiece of the virtual reality device; when the to-be-verified audio signal and the second audio signal meet a first matching condition, determine the to-be-verified audio signal as the target noise audio signal.

In one embodiment of the present disclosure, the virtual reality device further includes a sound acquiring apparatus and a sound playback apparatus, where, the first transfer function is a product of a second transfer function and a third transfer functions;

the second transfer function is a transfer function corresponding to a sound propagation path between the active heat dissipation apparatus and the sound acquiring apparatus;

the third transfer function is a transfer function corresponding to a sound propagation path between the sound acquiring apparatus and the sound playback apparatus.

Figure 6:
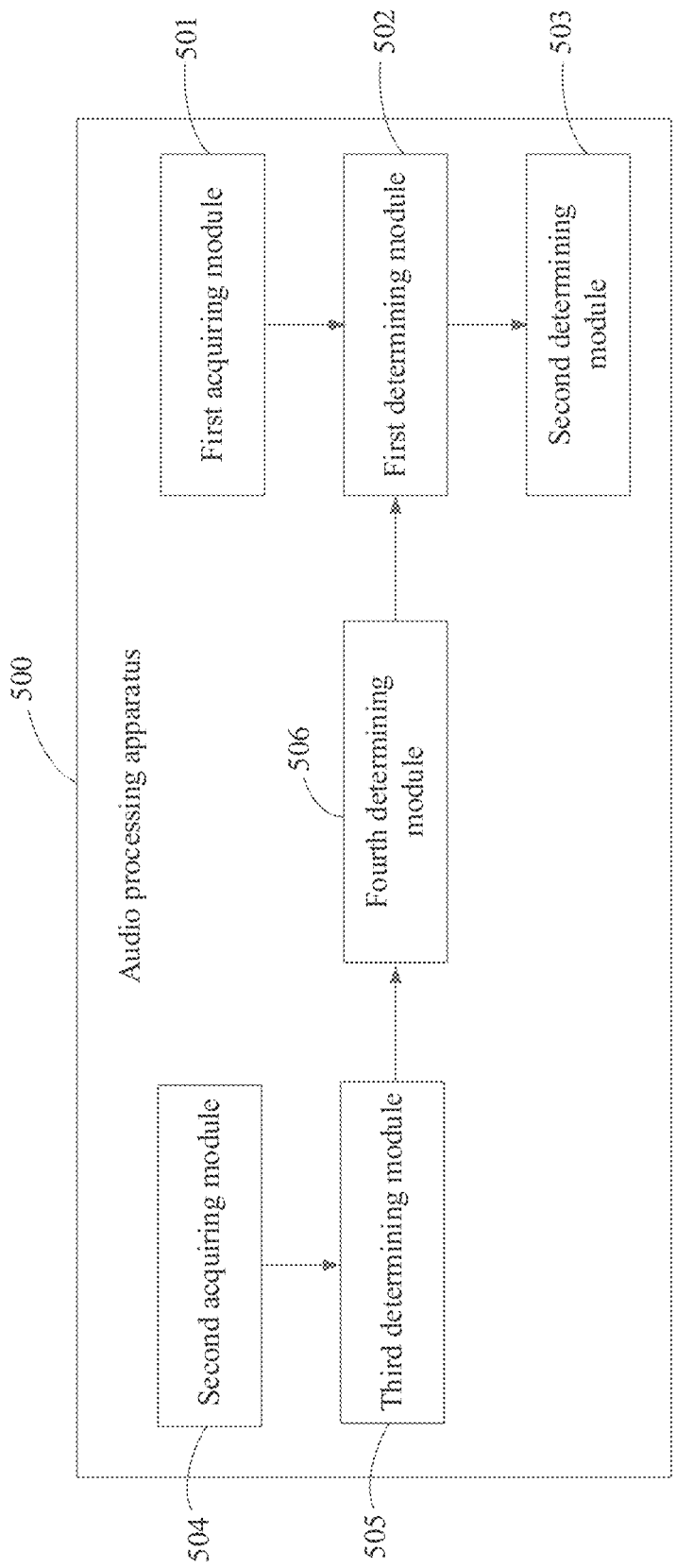
FIG. 6 is a second schematic structural diagram of an audio processing apparatus provided by an embodiment of the present disclosure.

In an embodiment of the present disclosure, referring to FIG. 6, the audio processing apparatus 500 further includes:

a second acquiring module 504, configured to obtain a second driving electrical signal of the active heat dissipation apparatus;

a third determining module 505, configured to determine a second audio signal corresponding to the second driving electrical signal;

a fourth determining module 506, configured to determine a second transfer function based on the second audio signal.

In one embodiment of the present disclosure, the fourth determining module 506 is specifically configured to determine a to-be-verified transfer function based on the second audio signal; obtain a third audio signal of an environment where the virtual reality device is located; when a signal obtained through processing the third audio signal by the to-be-verified transfer function meets a second matching condition, determine the to-be-verified transfer function as the second transfer function.

In one embodiment of the present disclosure, the second determining module 503 is specifically configured to: reduce a loudness of the target noise audio signal to a preset value to obtain the denoised audio signal; obtain the to-be-played audio signal of the virtual reality device; overlap the to-be-played audio signal with the denoised audio signal to obtain the target audio signal; and play the target audio signal.

The virtual reality device provided by this embodiment can be used to execute technical solutions of the above method embodiment, and the implementation principles and technical effects thereof are similar, which will not be elaborated in this embodiment.

An embodiment of the present disclosure also provides a virtual reality device, including an active heat dissipation apparatus and an audio processing apparatus in the above embodiment. Since the virtual reality device provided by the embodiment of the present disclosure includes the audio processing apparatus in the above embodiment, thus it has same beneficial technical effect as that of the above audio processing apparatus. A specific structure of the audio processing apparatus can be referred to corresponding expressions in the above embodiment, which will not be elaborated on details here.

In order to implement the above embodiments, an embodiment of the present disclosure also provides an electronic device.

Figure 7:
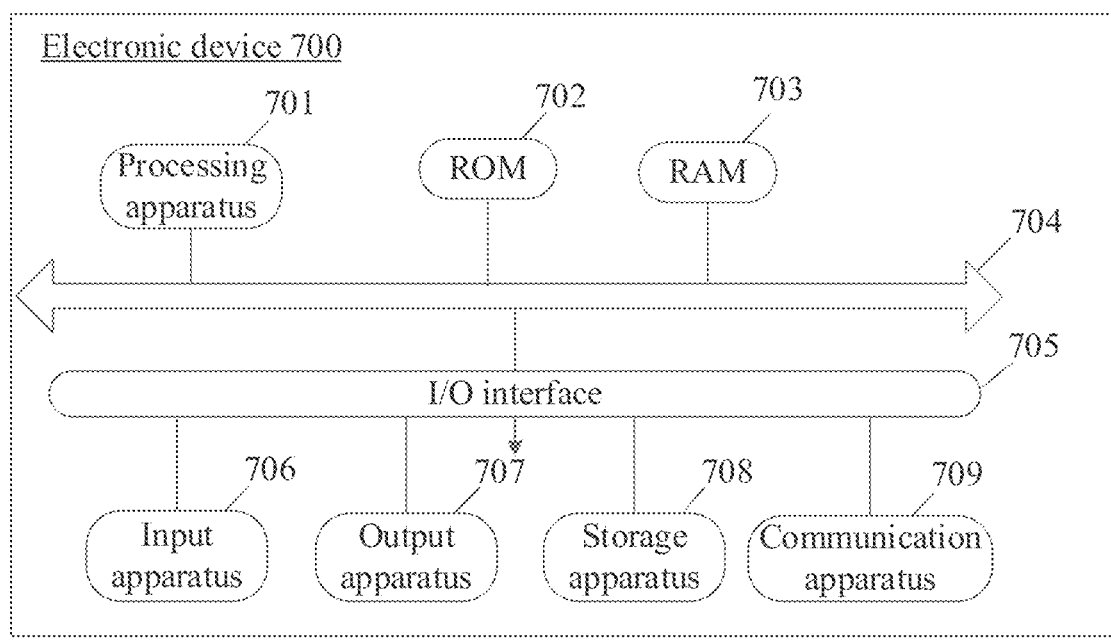
FIG. 7 is a schematic structural diagram of hardware of an electronic device provided by an embodiment of the present disclosure.

Referring to FIG. 7, a schematic structural diagram of an electronic device 700 suitable for implementing embodiments of the present disclosure is shown, and the electronic device 700 may be a terminal device or a server, where the terminal device may include, but is not limited to, a mobile terminal such as a mobile phone, a notebook computer, a digital broadcast receiver, a personal digital assistant (PDA), a portable android device (PAD), a portable multimedia player (PMP), an in-vehicle terminal (such as an in-vehicle navigation terminal) and the like, and a stationary terminal such as a digital TV, a desktop computer and the like. The electronic device shown in FIG. 7 is only an example and should not impose any limitations on functions and the scope of use of the embodiments of the present disclosure.

As shown in FIG. 7, the electronic device 700 can include a processing apparatus (for example, a central processing unit, a graphics processor and the like) 701, which may execute various appropriate actions and processing based on a program stored in a read-only memory (ROM) 702 or a program loaded into a random access memory (RAM) 703 from a storage apparatus 708. In the RAM 703, various programs and data necessary for operations of the electronic device 700 are also stored. The processing apparatus 701, the ROM 702 and the RAM 703 are connected to each other through a bus 704. An input/output (I/O) interface 705 is also connected to the bus 704.

Typically, the following apparatuses may be connected to the I/O interface 705: an input apparatus 706 including, for example, a touch screen, a touchpad, a keyboard, a mouse, a camera, a microphone, an accelerometer, a gyroscope and the like; an output apparatus 707 including, for example, a liquid crystal display (LCD), a speaker, a vibrator and the like; a storage apparatus 708, including, for example, a magnetic tape, a hard disk and the like; and a communication apparatus 709. The communication apparatus 709 may allow the electronic device 700 to communicate wirelessly or through wires with other devices to exchange data. While FIG. 7 shows the electronic device 700 having various apparatuses, it should be understood that not all of the illustrated apparatuses are required to be implemented or provided in the embodiment. More or fewer apparatuses may alternatively be implemented or provided.

In particular, according to the embodiments of the present disclosure, the processes described above with reference to the flowcharts may be implemented as a computer software program. For example, an embodiment of the present disclosure includes a computer program product, which includes a computer program carried on a computer-readable medium, the computer program contains program codes for performing the method illustrated in the flowchart. In such an embodiment, the computer program may be downloaded and installed from the network via the communication apparatus 709, or installed from the storage apparatus 708, or installed from the ROM 702. When the computer program is executed by the processing apparatus 701, the above functions defined in the method of the embodiment of the present disclosure are executed.

It should be noted that, the above-mentioned computer readable medium in the present disclosure may be a computer readable signal medium or a computer readable storage medium or a combination of the both. The computer readable storage medium may be, for example, but not limited to, an electrical, a magnetic, an optical, an electromagnetic, an infrared, or a semiconductor system, apparatus or device, or any combination of the above. More specific examples of the computer readable storage medium may include, but are not limited to: an electrical connection with one or more wires, a portable computer disk, a hard disk, a random access memory (RAM), a read only memory (ROM), an erasable programmable read only memory (EPROM or flash memory), an optical fiber, a portable compact disc read only memory (CD-ROM), an optical storage device, a magnetic storage device, or any suitable combination of the above. In the present disclosure, a computer readable storage medium may be any tangible medium that contains or stores a program, and the program may be used by or in combination with an instruction executive system, apparatus, or device. In the present disclosure, a computer readable signal medium may include a data signal propagated in a baseband or as a part of a carrier wave, and a computer readable program code is carried therein. This propagated data signal may adopt many forms, including but not limited to, an electromagnetic signal, an optical signal, or any suitable combination of the above. The computer readable signal medium may also be any computer readable media other than the computer readable storage medium, and the computer readable signal medium may send, propagate, or transmit the program used by or in combination with the instruction executive system, apparatus, or device. The program code contained on the computer readable medium may be transmitted by any suitable medium, including but not limited to: a wire, an optical cable, a Radio Frequency (RF), etc., or any suitable combination of the above.

The above-mentioned computer readable medium may be included in the above-mentioned electronic device; or it may exist alone without being assembled into the electronic device.

The above-mentioned computer readable medium carries one or more programs, and when the above-mentioned one or more programs are executed by the electronic device, the electronic device is caused to execute the method shown in above embodiments.

The computer program code used to perform operations of the present disclosure may be written in one or more programming languages or a combination thereof. The above-mentioned programming languages include object-oriented programming languages—such as Java, Smalltalk, C++, and also include conventional procedural programming languages—such as "C" language or similar programming languages. The program code may be executed entirely on a computer of a user, partly on a computer of a user, executed as an independent software package, partly executed on a computer of a user and partly executed on a remote computer, or entirely executed on a remote computer or a server. In a case where a remote computer is involved, the remote computer may be connected to the computer of the user through any kind of network—including a local area network (LAN) or a wide area network (WAN), or, it may be connected to an external computer (for example, use an Internet service provider to connect via the Internet).

The flowcharts and block diagrams in the drawings illustrate possible implementation architecture, functions, and operations of the system, method, and computer program product in accordance with the embodiments of the present disclosure. At this point, each block in the flowchart or the block diagram may represent a module, a program segment, or a part of code, and the module, the program segment, or the part of code contains one or more executable instructions for implementing a specified logical function. It should also be noted that, in some alternative implementations, the functions marked in the blocks may also occur in a different order from the order marked in the drawings. For example, two blocks shown one after another may actually be executed substantially in parallel, or sometimes may be executed in a reverse order, which depends on the functions involved. It should also be noted that, each block in the block diagram and/or flowchart, and a combination of the blocks in the block diagram and/or flowchart, may be implemented by a dedicated hardware-based system that performs the specified functions or operations, or may be implemented by a combination of dedicated hardware and computer instructions.

The units involved in the embodiments described in the present disclosure may be implemented in software or hardware. Where a name of the unit does not constitute a limitation on the unit itself in some cases. For example, the first obtaining unit may also be described as "a unit that acquires at least two Internet Protocol addresses".

The above functions described herein may be performed at least in part by one or more hardware logic components. For example, non-restrictively, exemplary types of hardware logic components that may be used include: a field programmable gate array (FPGA), an application specific integrated circuit (ASIC), an application specific standard product (ASSP), a system on chip (SOC), a complex programmable logic device (CPLD), etc.

In the context of the present disclosure, a machine readable medium may be a tangible medium that may contain or store programs for use by or in combination with an instruction executive system, apparatus or device. The machine readable medium may be a machine readable signal medium or a machine readable storage medium. The machine readable medium may include, but is not limited to, an electronic, a magnetic, an optical, an electromagnetic, an infrared, or a semiconductor system, apparatus or device, or any suitable combination of the above. More specific examples of the machine readable storage medium will include an electrical connection based on one or more lines, a portable computer disk, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the above.

In a first aspect, according to one or more embodiments of the present disclosure, an audio processing method is provided, which is applied to a virtual reality device, where the virtual reality device includes an active heat dissipation apparatus, and the audio processing method includes:

obtaining a first driving electrical signal of the active heat dissipation apparatus;

determining a target noise audio signal based on the first driving electrical signal and a first transfer function; and determining a denoised audio signal based on the target noise audio signal, where the denoised audio signal is used for denoising a to-be-played audio signal.

According to one or more embodiments of the present disclosure, the determining the target noise audio signal based on the first driving electrical signal and a first transfer function includes:

determining a first audio signal corresponding to the first driving electrical signal; and determining the target noise audio signal based on the first transfer function and the first audio signal.

According to one or more embodiments of the present disclosure, the determining the target noise audio signal based on the first transfer function and the first audio signal includes:

processing the first audio signal by means of the first transfer function to obtain a to-be-verified audio signal;

obtaining a second audio signal at an earpiece of the virtual reality device;

when the to-be-verified audio signal and the second audio signal meet a first matching condition, determining the to-be-verified audio signal as the target noise audio signal.

According to one or more embodiments of the present disclosure, where the virtual reality device further includes a sound acquiring apparatus and a sound playback apparatus, where, the first transfer function is a product of a second transfer function and a third transfer function;

the second transfer function is a transfer function corresponding to a sound propagation path between the active heat dissipation apparatus and the sound acquiring apparatus;

the third transfer function is a transfer function corresponding to a sound propagation path between the sound acquiring apparatus and the sound playback apparatus.

According to one or more embodiments of the present disclosure, before determining the target noise audio signal based on the first transfer function and the first audio signal, the method further includes:

obtaining a second driving electrical signal of the active heat dissipation apparatus;

determining a second audio signal corresponding to the second driving electrical signal; and determining the second transfer function based on the second audio signal.

According to one or more embodiments of the present disclosure, the determining the second transfer function based on the second audio signal includes:

determining a to-be-verified transfer function based on the second audio signal;

obtaining a third audio signal of an environment where the virtual reality device is located; and when a signal obtained through processing the third audio signal by the to-be-verified transfer function meets a second matching condition, determining the to-be-verified transfer function as the second transfer function.

According to one or more embodiments of the present disclosure, the determining the target audio signal based on the to-be-played audio signal and the target noise audio signal includes:

reducing a loudness of the target noise audio signal to a preset value to obtain the corrected audio signal;

overlapping the to-be-played audio signal with the corrected audio signal to obtain the target audio signal.

In a second aspect, according to one or more embodiments of the present disclosure, an audio processing apparatus is provided, which is applied to a virtual reality device, where the virtual reality device includes an active heat dissipation apparatus, and the audio processing apparatus includes:

a first acquiring module, configured to obtain a first driving electrical signal of the active heat dissipation apparatus;

a first determining module, configured to determine a target noise audio signal based on the first driving electrical signal and a first transfer function;

a second determining module, configured to determine a denoised audio signal based on the target noise audio signal, and the denoised audio signal is used for denoising a to-be-played audio signal.

According to one or more embodiments of the present disclosure, the first determining module is specifically configured to determine a first audio signal corresponding to the first driving electrical signal; and determine the target noise audio signal based on the first transfer function and the first audio signal.

According to one or more embodiments of the present disclosure, the first determining module is specifically configured to process the first audio signal by means of the first transfer function to obtain a to-be-verified audio signal; obtain a second audio signal at an earpiece of the virtual reality device; when the to-be-verified audio signal and the second audio signal meet a first matching condition, determine the to-be-verified audio signal as the target noise audio signal.

According to one or more embodiments of the present disclosure, the virtual reality device further includes a sound acquiring apparatus and a sound playback apparatus, where, the first transfer function is a product of a second transfer function and a third transfer functions;

the second transfer function is a transfer function corresponding to a sound propagation path between the active heat dissipation apparatus and the sound acquiring apparatus;

the third transfer function is a transfer function corresponding to a sound propagation path between the sound acquiring apparatus and the sound playback apparatus.

According to one or more embodiments of the present disclosure, the audio processing apparatus further includes:

a second acquiring module, configured to obtain a second driving electrical signal of the active heat dissipation apparatus;

a third determining module, configured to determine a second audio signal corresponding to the second driving electrical signal; and a fourth determining module, configured to determine a second transfer function based on the second audio signal.

According to one or more embodiments of the present disclosure, the fourth determining module is specifically configured to determine a to-be-verified transfer function based on the second audio signal; obtain a third audio signal of an environment where the virtual reality device is located; and when a signal obtained through processing the third audio signal by the to-be-verified transfer function meets a second matching condition, determine the to-be-verified transfer function as the second transfer function.

According to one or more embodiments of the present disclosure, the second determining module is specifically configured to: reduce a loudness of the target noise audio signal to a preset value to obtain the denoised audio signal; obtain the to-be-played audio signal of the virtual reality device; overlap the to-be-played audio signal with the denoised audio signal to obtain the target audio signal; and play the target audio signal.

In a third aspect, according to one or more embodiments of the present disclosure, a virtual reality device is provided, including an active heat dissipation apparatus and an audio processing apparatus according to the second aspect.

In a fourth aspect, according to one or more embodiments of the present disclosure, an electronic device is provided, including: at least one processor and a memory;

the memory stores computer execution instructions;

the at least one processor executes the computer execution instructions stored in the memory, to enable the at least one processor to execute the audio processing method according to the first aspect and various possible designs of the first aspect.

In a fifth aspect, according to one or more embodiments of the present disclosure, a computer readable storage medium is provided, where the computer readable storage medium stores computer execution instructions, and when a processor executes the computer execution instructions, the audio processing method according to the first aspect and various possible designs of the first aspect is implemented.

In a sixth aspect, according to one or more embodiments of the present disclosure, a computer program product is provided, including a computer program, where when the computer program is executed by a processor, the audio processing method according to the first aspect and various possible designs of the first aspect is implemented.

The above description is only preferred embodiments of the present disclosure and an illustration of the applied technical principles. Those skilled in the art should understand that, the disclosure scope involved in the present disclosure is not limited to the technical solutions formed by the specific combination of the above technical features, but also covers other technical solutions formed by the arbitrary combination of the above technical features or their equivalent features without departing from the above disclosure concept, for example, a technical solution formed by replacing the above features with technical features with similar functions disclosed (but not limited to) in the present disclosure.

In addition, although each operation is described in a specific order, this should not be understood as requiring these operations to be performed in the specific order or in a sequential order shown. Under certain circumstances, multitasking and parallel processing may be advantageous. Similarly, although several specific implementation details are included in the above discussion, these should not be interpreted as limiting the scope of the present disclosure. Certain features described in the context of a single embodiment may also be implemented in combination in the single embodiment. Conversely, various features described in the context of a single embodiment may also be implemented in multiple embodiments individually or in any suitable sub combination.

Although the subject matter has been described in a language specific to structural features and/or method logical actions, it should be understood that the subject matter defined in the appended claims is not limited to the specific features or actions described above. On the contrary, the specific features and actions described above are only exemplary forms for implementing the claims.

The invention claimed is:

1. An audio processing method, applied to a virtual reality device, wherein the virtual reality device comprises an active heat dissipation apparatus, and the method comprises:
   obtaining a first driving electrical signal of the active heat dissipation apparatus;
   determining a target noise audio signal based on the first driving electrical signal and a first transfer function;
   determining a denoised audio signal based on the target noise audio signal, wherein the denoised audio signal is used for denoising a to-be-played audio signal.

2. The method according to claim 1, wherein the determining the target noise audio signal based on the first driving electrical signal and a first transfer function comprises:
   determining a first audio signal corresponding to the first driving electrical signal;
   determining the target noise audio signal based on the first transfer function and the first audio signal.

3. The method according to claim 2, wherein the determining the target noise audio signal based on the first transfer function and the first audio signal comprises:
   processing the first audio signal by means of the first transfer function to obtain a to-be-verified audio signal;
   obtaining a second audio signal at an earpiece of the virtual reality device;
   when the to-be-verified audio signal and the second audio signal meet a first matching condition, determining the to-be-verified audio signal as the target noise audio signal.

4. The method according to claim 2, wherein the virtual reality device further comprises a sound acquiring apparatus and a sound playback apparatus, wherein,
   the first transfer function is a product of a second transfer function and a third transfer function;
   the second transfer function is a transfer function corresponding to a sound propagation path between the active heat dissipation apparatus and the sound acquiring apparatus;
   the third transfer function is a transfer function corresponding to a sound propagation path between the sound acquiring apparatus and the sound playback apparatus.

5. The method according to claim 4, wherein before determining the target noise audio signal based on the first transfer function and the first audio signal, the method further comprises:
   obtaining a second driving electrical signal of the active heat dissipation apparatus;
   determining a second audio signal corresponding to the second driving electrical signal;
   determining the second transfer function based on the second audio signal.

6. The method according to claim 5, wherein the determining the second transfer function based on the second audio signal comprises:
   determining a to-be-verified transfer function based on the second audio signal;
   obtaining a third audio signal of an environment where the virtual reality device is located;
   when a signal obtained through processing the third audio signal by the to-be-verified transfer function meets a second matching condition, determining the to-be-verified transfer function as the second transfer function.

7. The method according to claim 1, wherein the determining the denoised audio signal based on the target noise audio signal comprises:
reducing a loudness of the target noise audio signal to a preset value to obtain the denoised audio signal.

8. The method according to claim 1, where after the determining the denoised audio signal based on the target noise audio signal, the method further comprises:
obtaining the to-be-played audio signal of the virtual reality device;
overlapping the to-be-played audio signal with the denoised audio signal to obtain the target audio signal;
playing the target audio signal.

9. An audio processing apparatus, applied to a virtual reality device, wherein the virtual reality device comprises an active heat dissipation apparatus, and the audio processing apparatus comprises:
a processor and a memory;
the memory stores computer execution instructions;
the processor executes the computer execution instructions stored in the memory, to enable the processor to:
obtain a first driving electrical signal of the active heat dissipation apparatus;
determine a target noise audio signal based on the first driving electrical signal and a first transfer function;
determine a denoised audio signal based on the target noise audio signal, wherein the denoised audio signal is used for denoising a to-be-played audio signal.

10. The apparatus according to claim 9, wherein the processor is further enabled to:
determine a first audio signal corresponding to the first driving electrical signal;
determine the target noise audio signal based on the first transfer function and the first audio signal.

11. The apparatus according to claim 10, wherein the processor is further enabled to:
process the first audio signal by means of the first transfer function to obtain a to-be-verified audio signal;
obtain a second audio signal at an earpiece of the virtual reality device;
when the to-be-verified audio signal and the second audio signal meet a first matching condition, determine the to-be-verified audio signal as the target noise audio signal.

12. The apparatus according to claim 10, wherein the virtual reality device further includes a sound acquiring apparatus and a sound playback apparatus, wherein,
the first transfer function is a product of a second transfer function and a third transfer functions;
the second transfer function is a transfer function corresponding to a sound propagation path between the active heat dissipation apparatus and the sound acquiring apparatus;
the third transfer function is a transfer function corresponding to a sound propagation path between the sound acquiring apparatus and the sound playback apparatus.

13. The apparatus according to claim 12, wherein the processor is further enabled to:
obtain a second driving electrical signal of the active heat dissipation apparatus;
determine a second audio signal corresponding to the second driving electrical signal;
determine a second transfer function based on the second audio signal.

14. The apparatus according to claim 13, wherein the processor is further enabled to:
determine a to-be-verified transfer function based on the second audio signal;
obtain a third audio signal of an environment where the virtual reality device is located;
when a signal obtained through processing the third audio signal by the to-be-verified transfer function meets a second matching condition, determine the to-be-verified transfer function as the second transfer function.

15. The apparatus according to claim 9, wherein the processor is further enabled to:
reduce a loudness of the target noise audio signal to a preset value to obtain the denoised audio signal.

16. The apparatus according to claim 9, wherein the processor is further enabled to:
obtain the to-be-played audio signal of the virtual reality device;
overlap the to-be-played audio signal with the denoised audio signal to obtain the target audio signal;
play the target audio signal.

17. A virtual reality device, comprising an active heat dissipation apparatus and the audio processing apparatus according to claim 9.

18. A non-transitory computer readable storage medium, wherein the computer readable storage medium stores computer execution instructions, and when a processor executes the computer execution instructions, the processor is enabled to:
obtain a first driving electrical signal of the active heat dissipation apparatus;
determine a target noise audio signal based on the first driving electrical signal and a first transfer function;
determine a denoised audio signal based on the target noise audio signal, wherein the denoised audio signal is used for denoising a to-be-played audio signal.

19. The non-transitory computer readable storage medium according to claim 18, wherein the processor is further enabled to:
determine a first audio signal corresponding to the first driving electrical signal;
determine the target noise audio signal based on the first transfer function and the first audio signal.

20. The non-transitory computer readable storage medium according to claim 18, wherein the processor is further enabled to:
process the first audio signal by means of the first transfer function to obtain a to-be-verified audio signal;
obtain a second audio signal at an earpiece of the virtual reality device;
when the to-be-verified audio signal and the second audio signal meet a first matching condition, determine the to-be-verified audio signal as the target noise audio signal.

* * * * *